March 7, 1967 D. BIERI 3,307,987
PROCESS OF MAKING A GYPSUM WALLBOARD HAVING A DECREASED
STARCH CONTENT IN THE GYPSUM CORE
Filed Aug. 12, 1959
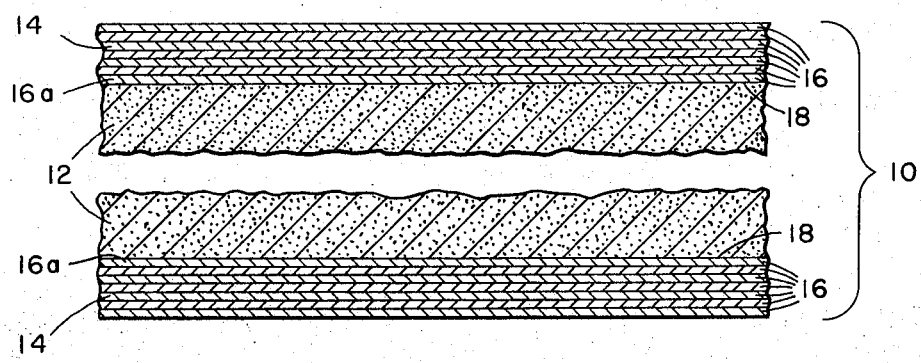
Fig. I
INVENTOR.
David Bieri
BY
ATTORNEY

United States Patent Office 3,307,987
Patented Mar. 7, 1967

3,307,987
PROCESS OF MAKING A GYPSUM WALLBOARD HAVING A DECREASED STARCH CONTENT IN THE GYPSUM CORE
David Bieri, Tonawanda, N.Y., assignor to National Gypsum Company, Buffalo, N.Y., a corporation of Delaware
Filed Aug. 12, 1959, Ser. No. 833,281
2 Claims. (Cl. 156—41)

This invention relates to an improved gypsum wallboard and to the novel method of making the improved gypsum wallboard.

Gypsum wallboard is manufactured by a relatively high speed, continuous method, wherein a slurry of calcined gypsum, with more than sufficient water for hydration and setting of the gypsum, is deposited on a lower, continuously advancing paper web, and an upper, continuously advancing paper web is laid over the slurry, and the whole is formed by large forming rolls into a continuous flat sheet of paper-enclosed, unset gypsum. This continuous sheet is carried on a conveyor and on rollers for a considerable distance until the gypsum core has set to a sufficient degree to permit the sheet to be cut into normal board lengths and carefully transferred to high temperature drying kilns.

One potential problem in gypsum board manufacture is in the providing of a strong bond between the gypsum core and the covering paper, in the final set and dried board. Heretofore, it has been generally considered necessary to provide for an absorption of water from the gypsum slurry into at least the first ply of the multi-ply paper employed in enclosing the gypsum core, to carry some dissolved gypsum into the paper which would crystallize into elongate crystals extending from the interface on into the paper, providing a resultant mechanical linking of the paper to the general body of the gypsum core.

This absorption of water by the paper, however, results also in decreasing substantially the ratio of water to unset gypsum in a very thin layer of the gypsum core immediately adjacent each cover paper, particularly during the initial period of setting of the gypsum core, when the ratio of water to gypsum is critical in obtaining the desired quality of set gypsum, uniformly throughout the core. In the thin layer of unset gypsum having a relatively lower water ratio, a different crystal growth occurs from that throughout the balance of the core, creating what is termed stratification. The existence of stratification and the problems it creates become increasingly apparent with any changes made to accelerate the setting of the gypsum, or to decrease the drying time in the kiln. Also, gypsum from ores of relatively lower purity causes the above problem to become proportionally more aggravating.

As the degree of the above stratification increases, the tendency of this thin layer of gypsum to become recalcined during drying in the kiln increases with any given set of kiln drying conditions. Accordingly, stratification creates a limiting factor in the drying speed and thus in the overall production rate for a manufacturing facility. If these two layers of gypsum adjacent the two paper cover sheets are allowed to become recalcined during drying, the integrity and strength of the core at these layers is completely destroyed.

This tendency toward recalcination of these layers has been lessened in the past by the known practice of adding a small percentage of starch to the gypsum core. In accordance with this prior method, the starch migrates toward and partially into the paper during drying, and by its hydrophilic nature, tends to retain a greater amount of water present wherever the starch becomes concentrated, including generally the zone whereat the abovesaid stratification problem occurred. The greater portion of the starch, however, was found to migrate on into the paper, because of the absorptive character of the paper. Thus for sufficient protection against recalcination in the zone of stratification, a larger amount of starch was necessary than would have been necessary if the starch were somehow concentrated primarily in the outermost zone of the gypsum core.

The additional amounts of starch required, in a core formulation as above stated, and the absorptivity of the paper liner necessitate greater proportions of water in forming the core, increasing the amount of drying ultimately required, thus, also, seriously limiting the rate at which board can be manufactured with given drying facilities.

It is an object of the present invention to provide a gypsum wallboard having an improved uniform core quality with a uniform strong bond to the paper liners.

It is a further object to provide a method of making such improved boards wherein substantial savings may be obtained through decreased starch requirement, lower water requirement, and accelerated board drying.

These and other objects and advantages will be more readily understood when considered in regard to the following preferred embodiments of the invention and the drawing in which FIG. 1 is a cross sectional view of a portion of gypsum wallboard embodying the present invention.

Referring now to FIG. 1 there is shown a segment of a gypsum wallboard 10 having a inner core 12 of set gypsum, and two paper liners 14 enclosing the core 12. Each paper liner 14 is formed in the usual manner with several plies 16, laminated, during the paper making process, into a single relatively heavy paper sheet of approximately .020" thickness.

The innermost ply 16a, of each liner 14, has an innermost surface 18, disposed at the interface of the paper liner 14 and the core 12, which has been treated, prior to the board manufacture, to make it highly water repellent or more specifically non-absorptive, without decreasing substantially the normal porosity of the paper. In the preferred form of the invention, the surface 18 or innermost ply 16a is sized with a water repellent agent which does not decrease porosity, such as Aquapel, a product of Hercules Powder Company defined as a combination with a water miscible emulsifying agent of alkylketene dimers having a ketene dimer structural formula

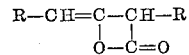

Other suitable materials for sizing the surface 18 in accordance with the invention are wax, some synthetic latices such as acrylonitrile, ammonium oleate, ammonium stearate, vinyl stearates, and other sizing agents which will not react with gypsum.

The size is preferably applied during the paper manufacturing process, during a final calendering step. The amount of size required will vary with the normal variations in paper and with the various types of sizing material and is best defined by the degree of non-absorptivity, or as will be termed herein water repellency, essentially in accordance with the invention.

One recognized method of determining the water repellency is a Cobb Test. This test consists of placing a five inch square, dry sheet of paper to be tested under a cylindrical water retaining ring of 100 square centimeters area, with the surface for which repellency is to be determined facing upward. Exactly 150 ml. of 120° F. water is placed in the ring, on the paper, for three minutes and is then poured off. The paper is quickly blotted to remove free water, and then weighed to determine the increase in grams over the dry weight. The value obtained is the Cobb value of the paper.

The water repellency of the surface 18 of liners 14, in accordance with the invention, has been found to be necessarily between about .4 and 1.0 gram, preferably .5 gram, Cobb value.

A second method of measuring the water repellency is a drop test wherein a .5 ml. drop of water at room temperature is placed, not dropped, on a dry paper surface to be tested, forming a ½ inch hemispherical drop. After allowing the drop to sit 5 minutes, the average diameter of wetted area, with and across the machine direction of the paper, is determined. A drop test of the surface 18 of the invention should result in substantially no spread after 5 minutes.

The porosity of the paper liners should be maintained, as with prior paper liners for gypsum board, at a minimum porosity by the Gurley densimeter such that no more than about 300 seconds is required to pass 100 cc. of air. This accepted prior minimum porosity will be understood to mean a sufficient porosity of the paper that no more than 300 seconds will be required for the passage of 100 cc. of air through the paper in a standard Gurley densimeter testing apparatus, with which one skilled in the art is familiar.

The preferred method of preparing the paper liners 14 of the invention consists of applying, as a sizing, a 2% solids aqueous emulsion of Aquapel, defined above. This emulsion is best applied at a calender stack, at 120° F. to 140° F., by means of a standard water box the application being directly to the innermost surface 18 of the liner 14. If an acid condition exists in the innermost ply 16a prior to the sizing, it is essential that the liner be previously treated with a mild alkaline solution, such as soda ash, sufficient to neutralize such acid condition of the innermost ply 16a. For the sizing, a suitable application rate of 2 to 3 pounds of Aquapel solids per ton of paper is preferred, a ton of standard wallboard paper liner being approximately 28,000 square feet.

A suitable wax emulsion for sizing in accordance with the invention may be applied as a 10% to 15% solids emulsion, at a rate of 8 to 10 pounds of solids per ton of paper.

A further method of providing a paper liner of the necessary water repellency and porosity in accordance with the invention is the conversion of a standard internally rosin sized paper liner by heating, such as in an oven for approximately 5 minutes at 300° F., sufficiently to cure the rosin size present in the paper.

Gypsum wallboard produced with any of the water-repellent-surfaced paper liners of the invention has been found, unexpectedly, to have highly suitable bond of the paper liner to the gypsum core, when substantially lesser amounts of starch are incorporated in the gypsum slurry composition than was commonly employed heretofore with relatively absorbent liners. For ⅜ inch thick gypsum wallboard, instead of the prior usual eight pounds of starch per thousand square feet of board, approximately two pounds of starch per thousand square feet is sufficient. The amount of water necessary in the initial gypsum slurry can be reduced about 20%, or from about 1100 pounds to less than 900 pounds of water per thousand square feet of board. This results in less water to be removed in the final drying step of the board manufacture, permitting an increase in speed of board manufacture, with standard gypsum board kilns, of about 25 to 30 feet per minute.

It has further been found that, contrary to prior theories in gypsum wallboard manufacture, although wallboard being produced in accordance with the invention evidences substantially no bond between paper liner and core in a partially set condition the final dried boards result in a bond of paper liner to gypsum core equal in strength to the internal strength of the paper, whereby attempts at separating paper from core result in internal ply separation of the paper. Such a finding is evidence of the existence of a completely satisfactory bond of paper liner to gypsum core.

The water repellent surface 18 of the invention prevents suction of water from a thin layer of the gypsum core immediately adjacent the paper liner, whereby, with equally distributed available water throughout the core during hydration, a resultant uniform core structure is formed, free of the prior stratification. It has been found that the water repellent surfaces 18 prevent substantially any penetration of water from the core into the liners prior to the time of the initial set of the gypsum core. Following the initial set and during the rapid high temperature wallboard drying step, a paper to gypsum core bond is formed which is believed to be a combination of an adhesion by the concentration of the starch at the interface caused by the water repellent paper surface, and of a slight crystal growth, during the final hydration of gypsum, into the pores of the paper. A resultant wallboard is formed, in accordance with the invention, of a unique physical structure at and adjacent to the interfaces of the core and paper liner, providing an improved form of adhesion of the elements, which is formed by the novel method, providing substantial overall economies, and freedom of raw material source and quality.

Having completed a detailed disclosure of a preferred embodiment of my invention so that those skilled in the art may practice the same, I contemplate that variations may be made without departing from the essence of the invention or the scope of the appended claims.

I claim:
1. The method of making paper covered gypsum wallboard comprising the steps of forming into board form an aqueous calcined gypsum slurry between two paper liners, said aqueous calcined gypsum slurry containing about 2 pounds of starch per per thousand square feet per ⅜ inch of thickness, each of said liners being of about .020 inch thickness, with said paper liner inner surfaces being disposed inwardly for bonding to said gypsum, said paper liners having, immediately prior to said forming, a Gurley densimeter minimum porosity of no greater than about 300 seconds per 100 cc. of air, said paper liner inner surfaces having, immediately prior to said forming, a water repellency such that the water drop test as defined herein results in substantially no spread after five minutes, and drying said board.

2. The method of claim 1 wherein the water repellency of said inner surface has, immediately prior to said forming, a water repellency Cobb value with 120° F. water of between about 0.4 and 1.0.

References Cited by the Examiner

UNITED STATES PATENTS

| | | | |
|---|---|---|---|
| 1,793,810 | 2/1931 | Levin | 156—41 |
| 2,346,999 | 4/1944 | Sandford et al. | 154—45.9 |
| 2,539,183 | 1/1951 | Child | 162—183 |
| 2,560,521 | 7/1951 | Camp | 154—86 |
| 2,590,013 | 3/1952 | Huntzicker et al. | 161—266 |
| 2,627,477 | 2/1953 | Downey | 106—287 |
| 2,776,234 | 1/1957 | Riddell et al. | 154—86 |
| 2,785,067 | 3/1957 | Osberg | 162—158 |
| 2,806,811 | 9/1957 | Von Hazmburg | 154—86 |
| 2,865,743 | 12/1958 | Weisgerber | 162—158 |
| 2,894,859 | 7/1959 | Wimmer et al. | 154—45.9 |
| 2,898,293 | 8/1959 | Capell et al. | 162—172 |
| 2,954,302 | 9/1960 | Gorman | 154—86 |

ALEXANDER WYMAN, *Primary Examiner.*

EARL M. BERGERT, C. F. KRAFFT, *Examiners.*

R. J. ROCHE, *Assistant Examiner.*